United States Patent [19]

Radlmann et al.

[11] 3,852,254

[45] Dec. 3, 1974

[54] ACRYLONITRILE-(CO)-POLYMERS WITH REDUCED SURFACE RESISTANCE

[75] Inventors: Eduard Radlmann; Gunther Nischk, both of Dormagen, Germany

[73] Assignee: Bayer Aktiengesellschaft, Leverkusen, Germany

[22] Filed: May 18, 1973

[21] Appl. No.: 361,528

[30] Foreign Application Priority Data
June 10, 1972 Germany............................ 2228362

[52] U.S. Cl.................... 260/85.5 R, 260/32.6 N, 260/45.85 H, 260/45.85 S, 260/88.7 D, 260/DIG. 16, 260/DIG. 19
[51] Int. Cl....... C08f 3/76, C08f 15/22, C08f 45/54
[58] Field of Search..... 260/88.7 R, 88.7 D, 85.5 R, 260/85.5 D, 45.85 H, 45.85 S, DIG. 16, DIG. 19

[56] References Cited
UNITED STATES PATENTS
2,698,856  1/1955  Carnes et al................. 260/DIG. 16
3,737,420  6/1973  Brokmeier et al............ 260/88.7 D

*Primary Examiner*—Harry Wong, Jr.
*Attorney, Agent, or Firm*—Plumley & Tyner

[57] ABSTRACT

Acrylonitrile-(co)-polymers with reduced surface resistance which comprise from 1 to 20 % by weight of antistatic agents which are produced by reaction of a polyether diol or an oxalkyl product with a sulfonato dicarbonic ester.

6 Claims, No Drawings

ACRYLONITRILE-(CO)-POLYMERS WITH REDUCED SURFACE RESISTANCE

This invention relates to acrylonitrile-(co)-polymers having reduced surface resistance which contain esters of polyalkylene ethers together with dicarboxylic acids which carry sulfonate groups.

Due to their electric surface resistance, shaped products of acrylonitrile-(co)-polymers readily take up an electric charge and are therefore limited in their technical applications.

There have been numerous attempts in the past to reduce the surface resistance to values below $10^{13}$ Ohm either by applying antistatically active substrates to the surface of the shaped products or by copolymerising acrylonitrile with suitable comonomers or by introducing antistatically active substances into the melt or solution of the polymers before they are shaped. The simplest of these three methods, which involves the least technical problems, has up to now been that of adding an antistatic agent to the melt or solution before it is processed. This method requires good compatibility of the antistatic agent with the polymer, stability against temperature stresses and resistance to evaporation, hydrolytic influences or removal by washing with water or organic solvents.

The antistatic additives hitherto known are dithiocarbonates, phosphoric acid amides, aminocarboxylic acid amides, ureas, polyalkylene oxides or polyalkylene oxides which contain terminal sulfonate groups. It was found that the antistatic action was particularly reinforced by the presence of these sulfonate end groups but to obtain a permanent reduction in the electric surface resistance it was necessary to introduce the sulfonate end groups by way of ether groups having resistance to saponification, for example by means of sultones.

We have now found that polyalkylene oxide derivatives in which the sulfonate groups are attached via ester groups in the molecule and not at the end of the chain also have a permanent antistatic action when added to acrylonitrile polymers. These new antistatic additives are in some cases also effective in other synthetic polymers.

This invention therefore provides a composition of matter comprising (A) an acrylonitrile polymer selected from the group consisting of a homopolymer and a copolymer and (B) an antistatic agent 1 – 20 percent by weight, based on the total composition, of a compound of the general formula

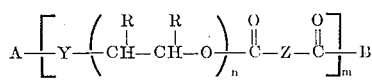

or

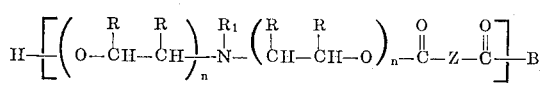

in which
n is an integer of from 1 to 100;
m is an integer of from 1 to 150;
R represents hydrogen or the methyl group,
A represents hydrogen, or a radical of the formula $R_1$—O—,

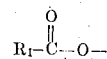

and

in which $R_1$ represents a linear or branched chain aliphatic group having 1 to 30 carbon atoms, an aryl, alkylaryl or arylalkyl group;
Y represents a single bond or a radical of the formula

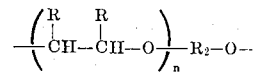

in which R and n have the meanings just defined and $R_2$ represents a straight chain or branched chain alkylene group having 1 to 20 carbon atoms, an arylene group or a radical of the formula

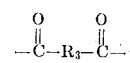

in which $R_3$ is a single bond, a straight chain or branched chain alkylene group having 1 to 20 carbon atoms or an arylene group,
B represents the radical —O—$R_1$ or

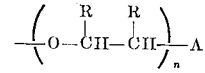

in which R, $R_1$, A and n have the meanings indicated above and
Z represents a radical of the formula

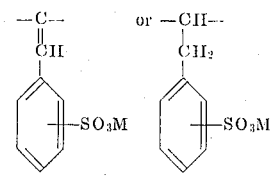

in which M is an alkali or alkaline earth metal.

Said composition of matter according to the invention is obtained, preferably in the form of threads by a process which comprises addition of an antistatically active compound of the general formula,

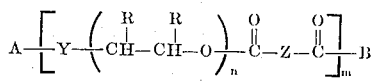

or

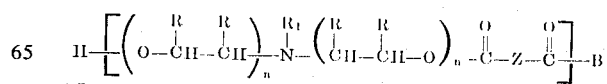

in which A, Y,R,Z,B, m and n are as just defined, to spinnable solutions or solvent-free melts of acrylonitrile polymers or -copolymers in amounts from 1 to 20 percent by weight, based on the total solids content, and then processing the solutions or solvent-free melts into shaped articles.

The antistatic agents added according to the invention can be prepared by condensing a mixture of a sulfonato-benzal or benzyl malonic acid ester of the general formula

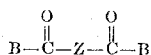

in which B and Z are as just defined, by a process which comprises an ester interchange with a polyetherdiol of ethylene oxide and/or propylene oxide or an alkoxylation product of an alcohol, diol, primary or secondary amine or a mono- or dicarboxylic acid of the general formula,

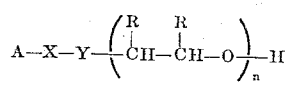

or

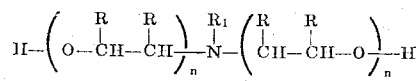

in which A,Y,R, and n are just defined, as a solvent-free melt in an inert gas atmosphere with exclusion of moisture at temperatures of 50° to 280°C in the presence of a catalyst.

The following are examples for the preparation of the sulfonato benzal or benzyl malonic acid esters.

a. 1,456 parts by weight of sodium-2-sulfonato-benzaldehyde, 1,232 parts by weight of diethyl malonate and 17.5 parts by weight of piperidine as catalyst are dissolved in 2,100 parts by volume of N,N-dimethylformamide and 2,100 parts by volume of benzene and heated to the reflux temperature. The water of condensation formed is removed from the system by azeotropic distillation. After removal of benzene by distillation, the dimethylformamide solution is clarified with active charcoal and the benzylidene compound obtained is hydrogenated at a hydrogen pressure of 100 excess atmospheres for 1.5 hours at 95°C after the addition of 50 parts by weight of Rancy Nickel. After removal of the catalyst by filtration, the dimethylformamide and excess diethyl malonate are distilled off quantitatively under vacuum. Sodium-2-sulfonate-benzyl-malonic acid diethyl ester remains behind in the form of a liquid which solidifies when cooled to 0°C and is solid at room temperature.

Yield: 2341 parts by weight (= 95.5% of the theory).

b. 192.0 parts by weight of lithium-4-sulfonato-benzaldehyde together with 176.0 parts by weight of diethyl malonate and 7.0 parts by weight of piperidine in a solvent mixture of 500 parts by volume of dimethyl sulfoxide and 300 parts by volume of benzene are heated to the reflux temperature of benzene. The water of condensation formed is removed azeotropically from the mixture. Condensation is terminated after about 7 hours. The solvent mixture is then removed quantitatively by vacuum distillation. The residue is then dissolved in 600 parts by volume of N,N-dimethylformamide and treated with 20 parts by weight of Raney nickel at 50°C for 3 hours to remove traces of dimethyl sulfoxide. The substance is then filtered and hydrogenated at a hydrogen pressure of 100 excess atmospheres for 2 hours at 95°C after the addition of 20 parts by weight of fresh Raney nickel. Lithium-4-sulfonato-benzyl-malonic acid diethyl ester remains behind after removal of the Raney nickel by filtration and removal of the dimethylformamide and excess diethyl malonate by distillation. The ester is solid but not crystalline at room temperature.

Yield: 326.6 parts by weight (= 97.2% of the theory)

The following are examples of antistatic additives which can be used in accordance with the invention:

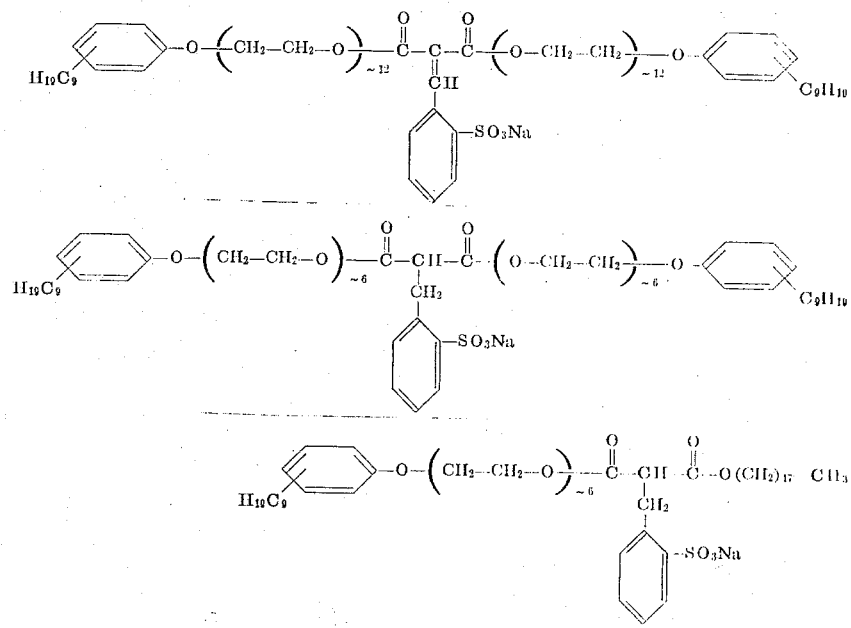

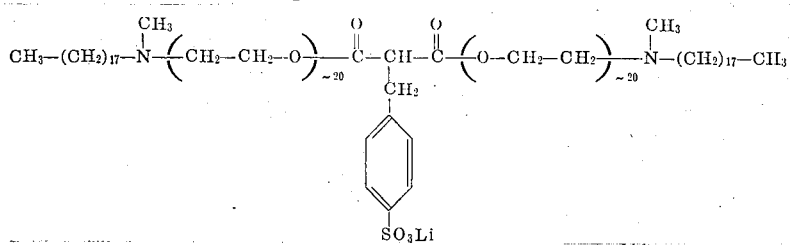
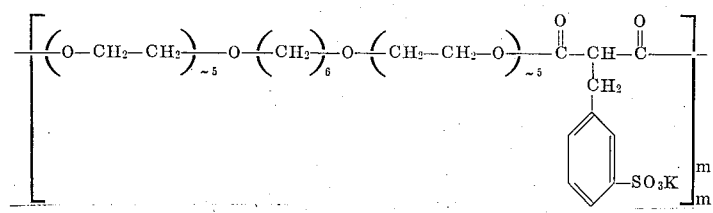
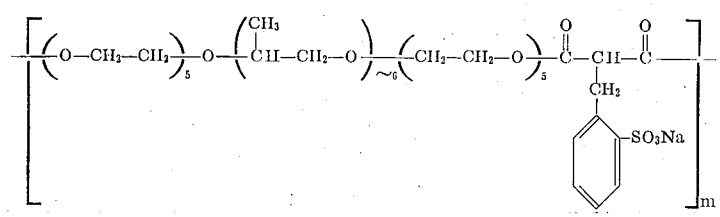
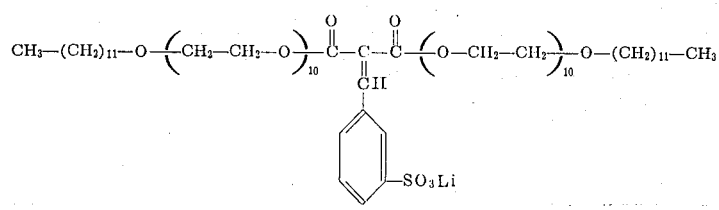
(A)
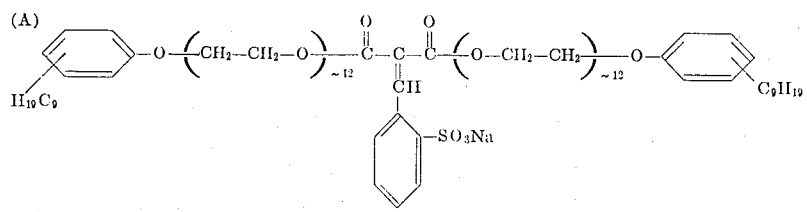
(B)
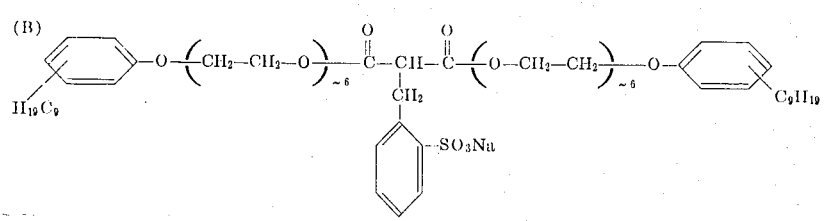
(C)
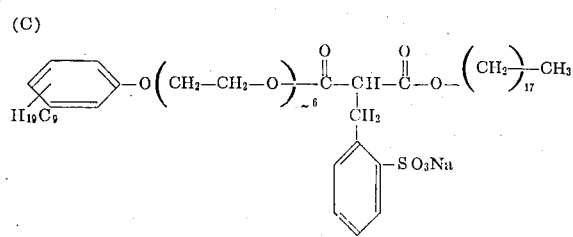
(D)
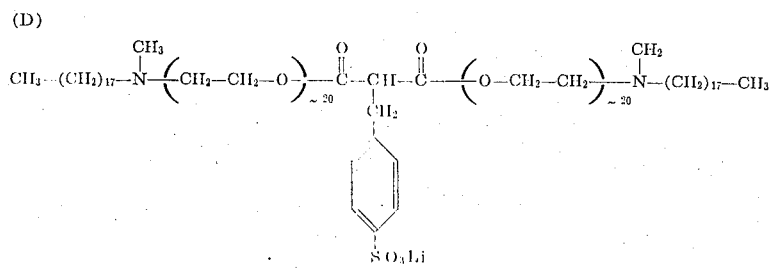

(E)

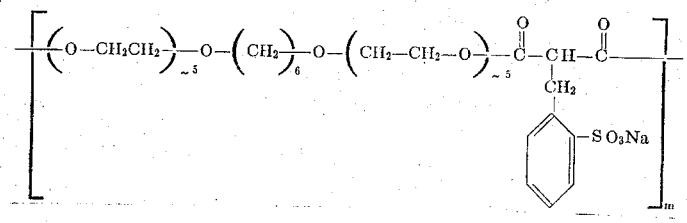

The antistatic agents according to the invention are compatible with acrylonitrile-(co)-polymers and do not separate from mixtures with these polymers. Other additives such as stabilizers, fillers, dyes, pigments, antioxidants and the like may also be added without the reduction in surface resistance being thereby affected and without the components separating from the mixture. Such mixtures can easily be processed into threads.

The acrylonitrile polymers to which this invention applies can be either pure polyacrylonitrile or acrylonitrile polymers which contain at least 60 percent by weight of polymerised acrylonitrile and up to 40 percent by weight of other copolymerisable compounds from the group of vinyl compounds and (meth)-acrylic compounds in a copolymerised form. The following are examples of suitable copolymerisable compounds: (Meth)-acrylic acid esters, (meth)-acrylic acid amides, vinyl chloride, vinylidene chloride and copolymerisable compounds which improve the affinity for acid or basic dyes.

The solvents used may be any solvents suitable for polyacrylonitrile, especially dimethylformamide.

It is a great advantage that fibres which contain the additives according to the invention do not substantially alter their surface resistance even after repeated washing with alkaline detergents. Apart from the excellent antistatic quality, the acrylonitrile-(co)-polymers according to the invention are distinguished by their good affinity for basic dyes.

The following examples are to further illustrate the invention without limiting it:

EXAMPLE 1

Varying quantities of the following antistatic additives are added to a 27% dimethylformamide solution of a polyacrylonitrile copolymer consisting of 94 parts by weight of acrylonitrile, 5 parts by weight of methylacrylate and 1 part by weight of the sodium salt of methallysulfonic acid having a K-valve of 88 (according to Fikentscher).

The resulting solutions are spun into threads by the dry spinning process in known manner. The surface resistance of the stretched threads is determined after air conditioning at 23°C and 50% relative humidity. The threads are then washed with a 0.5% solution of a commercial detergent at 40°C, dried and air conditioned before their surface resistance is again measured.

The results are summarized in Table 1 below. A sample of thread without antistatic additive is used for comparison.

Table 1

| Antistatic additive | Surface resistance at 23°C and 50% relative humidity [Ω] | | |
|---|---|---|---|
| | after stretching | after 5 washings | after 10 washings |
| none | $> 10^{13}$ | $> 10^{13}$ | $> 10^{13}$ |
| 6% by wt.A | $7 . 10^{10}$ | $8 . 10^{10}$ | $1 . 10^{11}$ |
| 8% by wt.B | $5 . 10^{10}$ | $6 . 10^{10}$ | $8 . 10^{10}$ |
| 10% by wt.C | $3 . 10^{10}$ | $3 . 10^{10}$ | $5 . 10^{10}$ |
| 5% by wt.D | $9 . 10^{10}$ | $8 . 10^{10}$ | $9 . 10^{10}$ |
| 6% by wt.E | $6 . 10^{10}$ | $7 . 10^{10}$ | $1 . 10^{11}$ |

The antistatic additives A – E can be produced as follows:

A. A mixture of 375.0 parts by weight of a ethoxylated isononyl phenol (mw = 750 determined by the OH-number), 87.5 parts by weight of the diethyl ester of sodium-2-sulfonato-benzal-malonic acid and 0.5 parts by weight of zinc acetate is heated to 150°C with stirring under a stream of nitrogen. As soon as most of the ethanol has distilled off, a vacuum is applied by means of a water jet pump and heating is continued for 2 hours at 150°C/15 mm Hg. After cooling to room temperature, an almost colourless, viscous material which has the following constitution remains behind; Yield: 431.6 parts by weight (= 98.2% of the theory).

B. A mixture of 488.0 parts by weight of an ethoxylated isononyl phenol (mw = 488 determined by the OH-number), 176.0 parts by weight of the diethyl ester of sodium-2-sulfonato-benzyl-malonic acid and 1.5 parts by weight of zinc acetate is heated to 160°C with stirring under a stream of nitrogen and heating is continued until no more ethanol distils off. Stirring is then continued for 2.5 hours at 160°C/15 mm Hg to complete the ester interchange reaction. After cooling to room temperature, a viscous product which is now only very slightly yellow remains behind.
Yield: 610.0 parts by weight (= 98.7% of the theory).

C. A mixture of 244.0 parts by weight of ethoxylated isononyl phenol (mw = 488 determined by the OH-number), 135.0 parts by weight of octadecanol-(1), 176.0 parts by weight of the diethyl ester of sodium-2-sulfonato-benzyl-malonic acid and 4.0 parts by weight of zinc acetate is heated to 150°C with stirring under a stream of nitrogen. As soon as no more ethanol distils off, a vacuum of 15 mm Hg is applied and the reaction continued at this vacuum for 1 hour to complete the ester interchange. After cooling to room temperature, a colourless, solid product is obtained.
Yield: 499.3 parts by weight (= 98.1% of the thoery).

D. 591.5 parts by weight of ethoxylated N-methylstearylamine (mw = 1183 determined by the OH-number), 84.0 parts by weight of the diethyl ester of lithium-4-sulfonato-benzyl-malonic acid and 5 parts by weight of calcium acetate are together heated to 165°C with stirring under a stream of nitrogen. When all the ethanol has been split off, the pressure is reduced to 12 mm Hg and the reaction continued at this pressure for 2 hours. After cooling to room temperature, a pale yellow ester interchange product remains.

Yield: 631.6 parts by weight (96.8% of the theory).

E. 568.0 parts by weight of ethoxylated hexane-1,6-diol (mw = 568 determined by the OH-number), 324.0 parts by weight of the dimethyl ester of sodium-2-sulfonato-benzyl-malonic acid and 8 parts by weight of zinc acetate are heated to 160°C under a stream of nitrogen with stirring. When all the methanol has distilled off, ester interchange is completed by continuing the reaction at a pressure of 14 mm Hg for 3 hours. An almost colourless condensation product which is highly viscous at room temperature and partly solidifies when left to stand for some time remains.

Yield: 815.6 parts by weight (= 98.5% of the theory).

EXAMPLE 2

The antistatic additives mentioned in Example 1 were added in varying quantities as described in Example 1 to a 27% dimethylformamide solution of a polyacrylonitrile copolymer consisting of 61.3 parts by weight of acrylonitrile, 37 parts by weight of vinylidene chloride and 1.7 parts by weight of the sodium salt of methallylsulfonic acid having a K value of 84 (according to Fikentscher). The threads were dry spun, their surface resistance was determined and the washing processes were carried out as described in Example 1.

The results of measurements of the surface resistance related to the antistatic additive and the number of washings are shown in Table 2.

Table 2

| Antistatic additive | Surface resistance at 23°C and 50% relative humidity | | |
|---|---|---|---|
| | after stretching | after 5 washings | after 10 washings |
| none | $> 10^{13}$ | $> 10^{13}$ | $> 10^{13}$ |
| 7% by wt.A | $6 \cdot 10^{10}$ | $8 \cdot 10^{10}$ | $1 \cdot 10^{11}$ |
| 6% by wt.B | $8 \cdot 10^{10}$ | $9 \cdot 10^{10}$ | $9 \cdot 10^{10}$ |
| 7% by wt.C | $4 \cdot 10^{10}$ | $3 \cdot 10^{10}$ | $6 \cdot 10^{10}$ |
| 8% by wt.D | $2 \cdot 10^{10}$ | $4 \cdot 10^{10}$ | $8 \cdot 10^{10}$ |
| 10% by wt.E | $2 \cdot 10^{10}$ | $3 \cdot 10^{10}$ | $3 \cdot 10^{10}$ |

What we claim is:

1. A composition of matter comprising (A) an acrylonitrile polymer selected from the group consisting of an acrylonitride homopolymer and a copolymer containing at least 60 percent by weight of polymerized acrylonitrile, and (B) 1 – 20 percent by weight, based on the total composition, of an antistatic agent of the formula

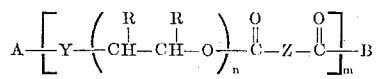

or

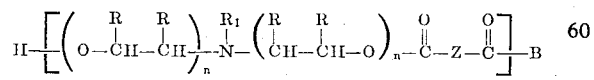

in which
- $n$ is an integer of from 1–100;
- $m$ is an integer of from 1–150;
- R is hydrogen or methyl;
- A is hydrogen or a radical of the formula $R_1-O-$,

or

in which $R_1$ represents a linear or branched chain aliphatic group containing 1–30 carbon atoms, aryl, alkylaryl or arylalkyl;

Y is a single bond or a radical of the formula

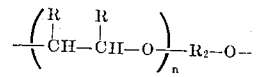

in which R and $n$ have the above meanings and $R_2$ is a straight chain or branched chain alkylene containing 1–20 carbon atoms, arylene, or a radical of the formula

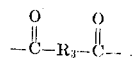

in which $R_3$ represents a single bond or a straight chain or branched chain alkylene containing 1–20 carbon atoms or arylene;

B is $-O-R_1$, or

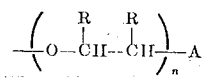

in which R, $R_1$, A and $n$ have the above meanings, and

Z is a radical of the formula

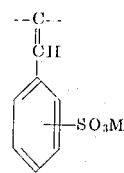

or

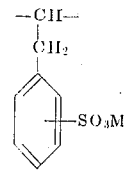

in which M is an alkali metal or alkaline earth metal.

2. The composition of matter of claim 1, wherein said acrylonitrile polymer consists of at least 60 percent by weight of acrylonitrile and up to 40 percent by weight of a compound being copolymerisable with acrylonitrile, selected from the group consisting of a vinyl compound, an acrylic compound, a methacrylic compound and mixtures thereof.

3. The composition of claim 2, wherein said compound, being copolymerisible is selected from the group consisting of an acrylic acid ester, a methacrylic acid ester, an acrylic acid amide, a methacrylic acid amide, vinyl chloride, vinylidene chloride and a mixture thereof.

4. The composition of matter of claim 1, containing copolymerised with them, compounds which have acid or basic groups.

5. Threads and foils of the composition of matter according to claim 1.

6. A process for the production of threads with an antistatic finish from acrylonitrile polymers which comprises the addition of an antistatically active compound, as defined in claim 1, to spinnable solutions of acrylonitrile polymers in quantities of 1 to 20 percent by weight, based on the total solids content, and spinning the solutions.

* * * * *

UNITED STATES PATENT AND TRADEMARK OFFICE
CERTIFICATE OF CORRECTION

PATENT NO. : 3,852,254
DATED : December 3, 1974
INVENTOR(S) : Eduard Radlmann et al It is certified that error appears in the above-identified patent and that said Letters Patent are hereby corrected as shown below:

Column 3, formula line 25, "A-X-Y", delete --- X ---.

Column 5 and 6, delete formulas A-D.

Column 7, delete formula top of Columns 7 and 8, insert formulas A-D from Columns 5 and 6.

Signed and Sealed this

Sixth Day of June 1978

[SEAL]

Attest:

RUTH C. MASON
*Attesting Officer*

DONALD W. BANNER
*Commissioner of Patents and Trademarks*